United States Patent [19]

Smith et al.

[11] Patent Number: 4,654,869
[45] Date of Patent: Mar. 31, 1987

[54] INFORMATION COLLECTING AND FORWARDING APPARATUS

[75] Inventors: Mark G. Smith, Naugatuck; Karen J. French, Greenwich; David A. Zeller, Jr., Brookfield; Franklin Hargrave; Francisco A. Middleton, both of Newtown, all of Conn.

[73] Assignee: ITT Corporation, New York, N.Y.

[21] Appl. No.: 774,780

[22] Filed: Sep. 11, 1985

[51] Int. Cl.⁴ .......................................... H04M 11/00
[52] U.S. Cl. ...................................... 379/107; 379/93
[58] Field of Search ................. 179/2 AM, 2 BC, 70, 179/77, 2A; 370/59

[56] References Cited

U.S. PATENT DOCUMENTS

| | | | |
|---|---|---|---|
| 4,380,687 | 4/1983 | Stewart | 179/2 BC |
| 4,549,044 | 10/1985 | Durham | 179/2 AM X |
| 4,578,536 | 3/1986 | Oliver | 179/2 AM |

Primary Examiner—James L. Dwyer
Attorney, Agent, or Firm—Robert A. Hays; Peter C. Van Der Sluys

[57] ABSTRACT

An apparatus for collecting and forwarding encoded information includes a source of power maintained from the output port thereof to provide power to the source of encoded informations whereby a local subscriber is not required to supply power to such encoders via the AC mains to his premises.

19 Claims, 14 Drawing Figures

|  | 0 | 1 | 2 | 3 | 4 | 5 | 6 | 7 | 8 | 9 |
|---|---|---|---|---|---|---|---|---|---|---|
|  | START BIT | | ENCODER ID¹ | | | | STATUS² | | PARITY BIT | STOP BIT |

1. BITS 1-4 OF EACH STATUS WORD WILL YIELD ENCODER ID WITH THE LEAST SIGNIFICANT NIBBLE OF THE BINARY ID IN THE FIRST STATUS WORD AND THE MOST SIGNIFICANT NIBBLE IN THE SECOND WORD

2. IF BIT 7 IS SET IN BOTH STATUS WORDS THE METER HAS BEEN TAMPERED WITH

*FIG. 10*

|  END  |  NULL DATA  |  DIAL READINGS  |  |  LSD  |  ID  |  LSD  |
|---|---|---|---|---|---|---|

WORD DESCRIPTION — LSB

○ ALL WORDS OF VALID DATA ARE BCD SEE FIGURE 6 FOR BIT FORMAT DETAILS

○ NULL DATA IS BINARY 14 (1110)

○ END OF MESSAGE IS BINARY 15 (1111)

*FIG. 11* o ALL DATA AND START OF BIT AND END OF BIT ARE INVERTED
o 4TH 1/4 IS ALWAYS 1 (REPRESENTING A 0)
o 1ST 1/4 IS ALWAYS OPPOSITE OF LAST 1/4 OF A BIT
o IN THE FIRST BIT OF A BCD WORD THE 1ST 1/8 AND 2ND 1/8 ARE OPPOSITE o ALL DATA IS 10 BIT ASCII
o START IS ASCII R
o END IS ASCII CARRIAGE RETURN

INFORMATION COLLECTING AND FORWARDING APPARATUS

BACKGROUND OF THE INVENTION

The present invention generally relates to an information collecting and forwarding apparatus and, in particular, relates to one such apparatus including means for providing power to the information sources connected thereto, the power being derived via an output port of the apparatus.

The advantages and general system technique for using and existing telephone systems equipment for the remote metering of such things as utilities and other services has been fully described in U.S. patent application Ser. Nos. 648,542; 667,527, now U.S. Pat. No. 460,362, and 667,789 filed on Sept. 7, 1984, Nov. 2, 1984 and Nov. 2, 1984, respectively.

Therein a system is described whereby a customer, i.e., a utility, is able to access a modem or the like, located at the telephone subscriber's premises for the purpose of, inter alia, reading utility meters. The system described included a subscriber premises unit that could provide an active, passive or interactive subscriber interface.

Currently, a considerable number of different meter reading encoder devices are known in the art. Such devices usually convert an analog meter reading into a digital signal for transmission to a remote information collection mechanism. One primary drawback, at the present time, is that these devices are individually tailored not only to the particular type of service monitored, i.e., water, gas, electric, etc. but to a specific data transmission rate and format used to communicate with the remote station. Furthermore, the conventional remote stations are adapted to be useful for reading only a particular type of utility meter, such as a water meter. Nevertheless, such a design does allow the reading of a multiplicity of identically equiped water meters.

Another drawback of present metering mechanisms is that a supplementary power supply must be connected between the encoder and the subscriber's power lines. The power supply usually includes an A.C. to D.C. converter to allow the 110 volt A.C. power source to be used by the meter reading encoder operating via a D.C. power source. In addition to alienating some customers, the use of a subscribers power mains has the drawback that, during a localized power outage, the meter cannot be read. This can be disruptive to the establishment of a system for reading a large number of meters. In addition, such power outages can render any "time of day" system ineffective. A "time of day" system being one that, for example, automatically reads specific meters at a specific time. Such "time of day" systems have a particular advantage in the general field of energy management wherein a higher rate may be applied for a high level use during daylight hours in the summer to, for example, reduce the use of high consumption air conditioning units. Further, this can be a source of tampering by an occupant, i.e. by periodically shutting off his power, the accuracy of, for example, a water meter reading can be brought into question.

In some conventional designs the actual meter reading functions, including the frequency at which the readings are taken, as well as other primary functions of interest to a utility, are provided at the subscriber premises and within the meter encoding mechanism. The difficulty with such systems is that these encoders are subject to tampering as well as catastrophic failure. Either event requires the utility company, or the user of such encoders, to expend both time and manpower in the repair of these devices at a potentially large number of locations.

Consequently, there is a considerable commercial need for a subscriber premises apparatus that not only collects encoded information from a plurality of different types of encoders but is capable of being controlled by a remote command and control data processing center. In addition, it is desireable that such an apparatus does not require the use of the local premises power supply.

SUMMARY OF THE INVENTION

Accordingly, it is one object of the present invention to provide a subscriber premise information collecting and forwarding apparatus that overcomes the above recited difficulties.

This object is accomplished, at least in part, by an information collecting and forwarding apparatus having means for collecting encoded information from a selected one of a plurality of different type encoded information sources, means for forwarding, via an output port of the apparatus, the collected encoded information and means for providing power to the encoded information source during the reading thereof, the power source being recharged via the output port of the apparatus.

Other objects and advantages will become apparent to those skilled in the art from the following detailed description read in conjunction with the appended claims and the drawing attached hereto.

BRIEF DESCRIPTION OF THE DRAWINGS

FIGS. 9 and 10 are diagrams of a typical data format of one type of meter encoder;

FIGS. 11 and 12 are diagrams of a typical data format of another type of meter encoder;

DETAILED DESCRIPTION OF THE INVENTION

Figure 1:
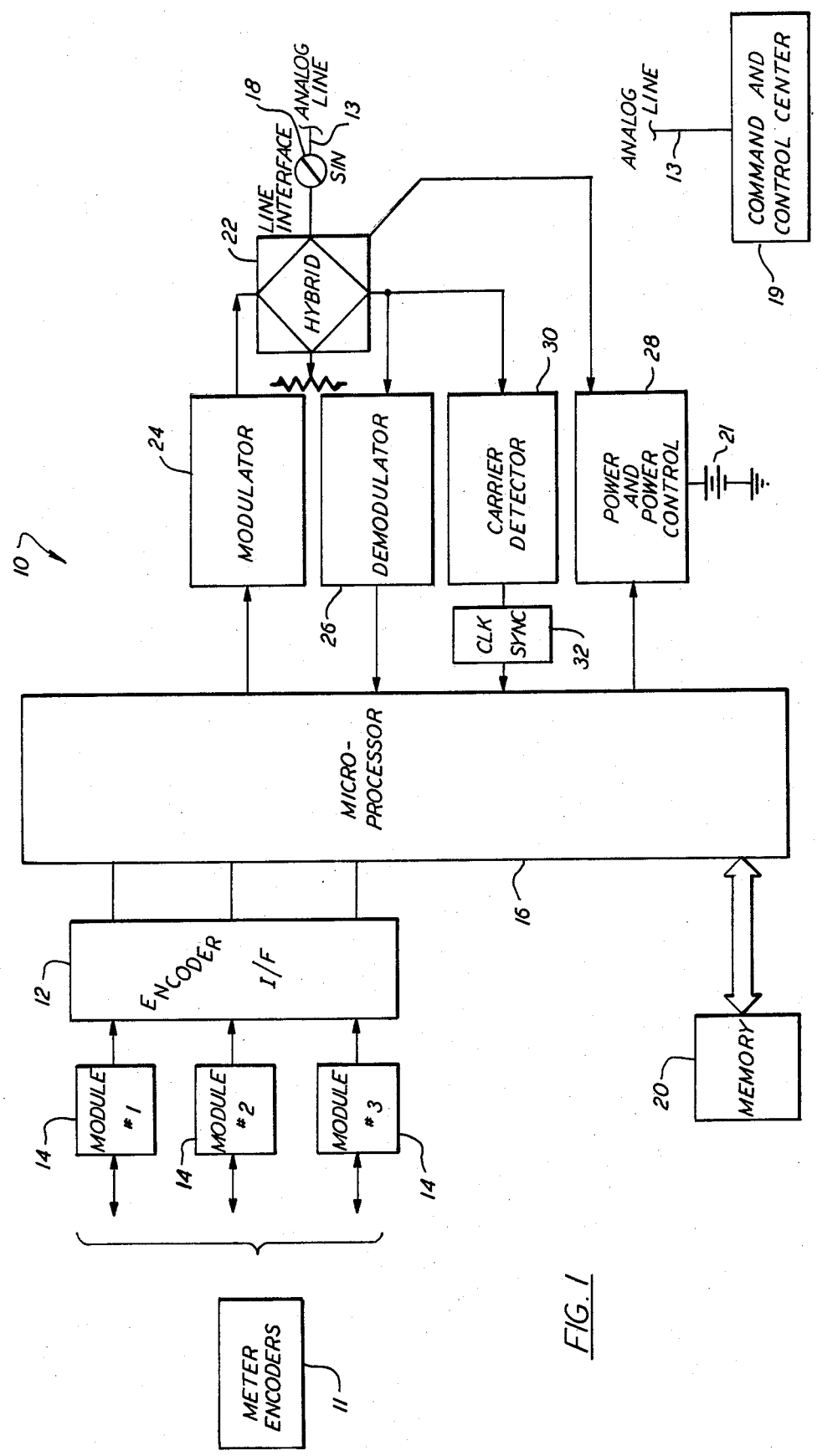
FIG. 1 is a block diagram of an apparatus embodying the principles of the present invention.

An apparatus, generally indicated at 10 in FIG. 1 and embodying the principles of the present invention, for collecting and forwarding information from a plurality of information sources 11, such as, for example, utility meter encoders. As shown in FIG. 1, the apparatus 10 includes a means 12 for interfacing with the plurality of information sources 11, and a plurality of means 14 for modularly adapting the means 12 to different types of information sources 11. The apparatus 10 further includes means 16 for controlling the flow of information between the means 12 for interfacing with the plurality of information sources 11 and external subscriber line 13 via a subscriber network interface 18 and an on-board source of D.C. power 21. In one system embodiment, the subscriber line 13 is ultimately connected to a command and control center 19 of a utility company. The information flow control means 16 preferably has a memory 20 associated therewith. In addition, the means 16 for controlling the flow of information is interconnected, via a modulator 24, a demodulator 26, a power controller 28 and a carrier detector 30 to the external subscriber line 13 by means of a hybrid 22. The carrier detector 30 interconnects with the control means 16 via a clock sychronizing device 32.

In one particular implementation the apparatus 10 is installed at the subscriber premises and connected, via the hybrid 22, to a communication network interface and to the tip and ring pair of a conventional subscriber telephone line 13. In addition, it is also connected to a plurality, for example, three, of different types of information sources 11, i.e., meter encoders.

Operationally, in general, the apparatus 10 remains inactive until a signal is received via the subscriber telephone line 13 from the remote command and control center 19. Preferably, the signals exchanged between the apparatus 10 and the remote command and control center 19 are conveyed via the test trunk of the local central office switch of the telephone company, not shown in FIG. 1. The use of the test trunk is advantageous since access to the subscriber line 13 is accomplished without causing a ringing signal to be sent to the subscriber's telephone. Alternatively, the apparatus 10 can be accessed directly via the main distribution frame of the central office. One advantage of accessing via the main distribution frame is that, if the subscriber goes OFF HOOK while the meter is being accessed the access line can be dropped immediately without interfacing with the subscriber's service. If the test trunk device is used to access the apparatus 10 and the subscriber goes OFF HOOK during meter access, the subscriber will be unable to obtain a dial tone for a short period of time, for example, about three seconds.

In one particular embodiment, the controller means 16 is a microprocessor having an associated memory 20. One particular microprocessor useful in the present apparatus 10 is the Motorola 146805E2 microprocessor device, manufactured and marketed by Motorola Inc. of Austin, Tex.

Figure 2:
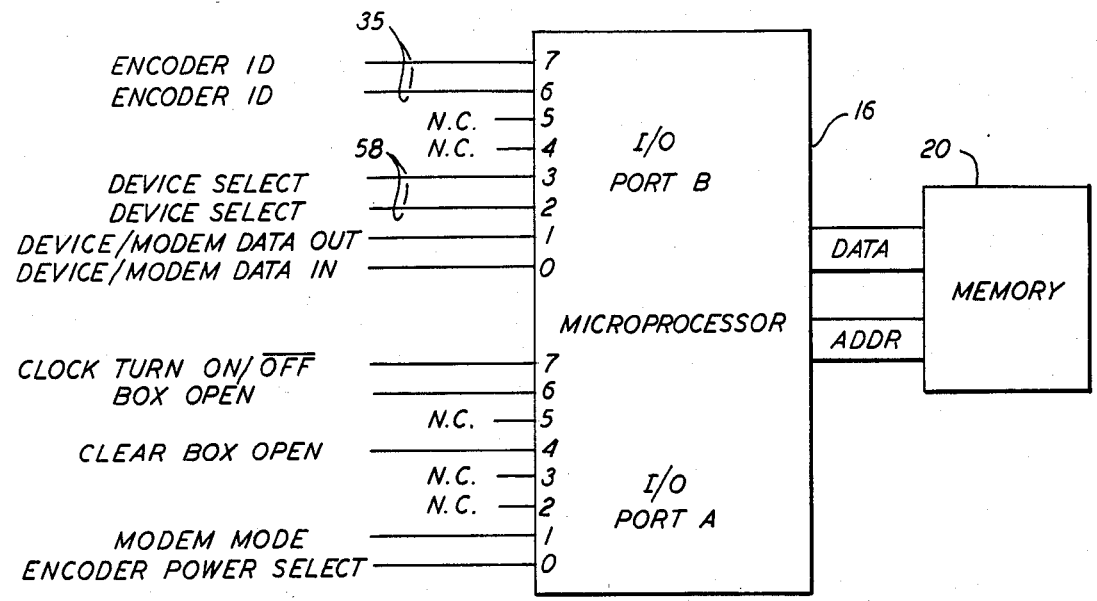
FIG. 2 is a block diagram of the microprocessor input/output port pin assignments.

In one particular embodiment, the port connections for the above identified microprocessor are assigned as shown in FIG. 2. The 16 input/output lines of the microprocessor are configured as two 8-bit ports, A and B, each being programmable as either an input port or an output port. These particular port functions for one implementation are as follows:

TABLE 1

| PIN # | FUNCTION | LOGIC 1 RESULTS | LOGIC 0 RESULTS |
|---|---|---|---|
| PORT A | | | |
| 7 | clock enable/disable | clock input enable | clock input disable |
| 6 | box open | box open | box closed |

TABLE 1-continued

| PIN # | FUNCTION | LOGIC 1 RESULTS | LOGIC 0 RESULTS |
|---|---|---|---|
| PORT A | | | |
| 5 | unassigned | | |
| 4 | clear box open | high then low to clear | |
| 3 | unassigned | | |
| 2 | unassigned | | |
| 1 | modem mode | receive | transmit |
| 0 | encoder power | power off | power on |
| PORT B | | | |
| 7 | encoder ID | data = 1 | data = 0 |
| 6 | encoder ID | data = 1 | data = 0 |
| 5 | unassigned | | |
| 4 | unassigned | | |
| 3 | device select | data = 1 | data = 0 |
| 2 | device select | data = 1 | data = 0 |
| 1 | data out | data = 1 | data = 0 |
| 0 | data in | data = 1 | data = 0 |

The bit direction programming of the microprocessor is preferably performed and designated at power up although it can also be accomplished by writing a value in the data direction register for each port. In the preferred implementation, the data direction registers are memory mapped into a low address of the microprocessor memory space. One of the essential functions performed by the controller means 16 is a clock enable that allows the enabling and disabling of the oscillator input to the controller means 16 to ensure proper operation of the clocks when the apparatus 10 is changed from the inactive, or recharging, mode to the active mode.

Another function is the tamper detection mechanism that utilizes, as shown in FIG. 2, the box open and the box closed ports. The microprocessor is, preferably, programmed to automatically indicate when the box containing the apparatus 10 is opened and closed. In addition, an information latch maintaining the status of the switch is included with the microprocessor. Consequently, when the apparatus 10 is opened, the action is recorded in the information latch and reported via an input pin to, for example, port A. Hence, the information that the box was opened, even if it was subsequently closed, becomes latched until cleared by the microprocessor. As shown in FIG. 2, the number 7 pin of port A, designated clock on/off, is provided to turn on and off the power to the modem such that the apparatus 10 draws normal power only during the operation of reading the meter and transmitting the information to the remote command and control center 19 and, at other time, draws a greatly reduced power. As more fully discussed below, the power for the apparatus 10 and also the meter encoder, per se, is drawn via the D.C. source 21, i.e., a 6 volt battery, that is continuously trickle charged via the output port, i.e., the hybrid 22, of the apparatus 10 from the tip and ring wires of the subscriber line 13 during the inactive mode. Typically, as more fully discussed below, the recharging power source is the central office of the telephone company and is about −48 volt D.C.

Figure 3:
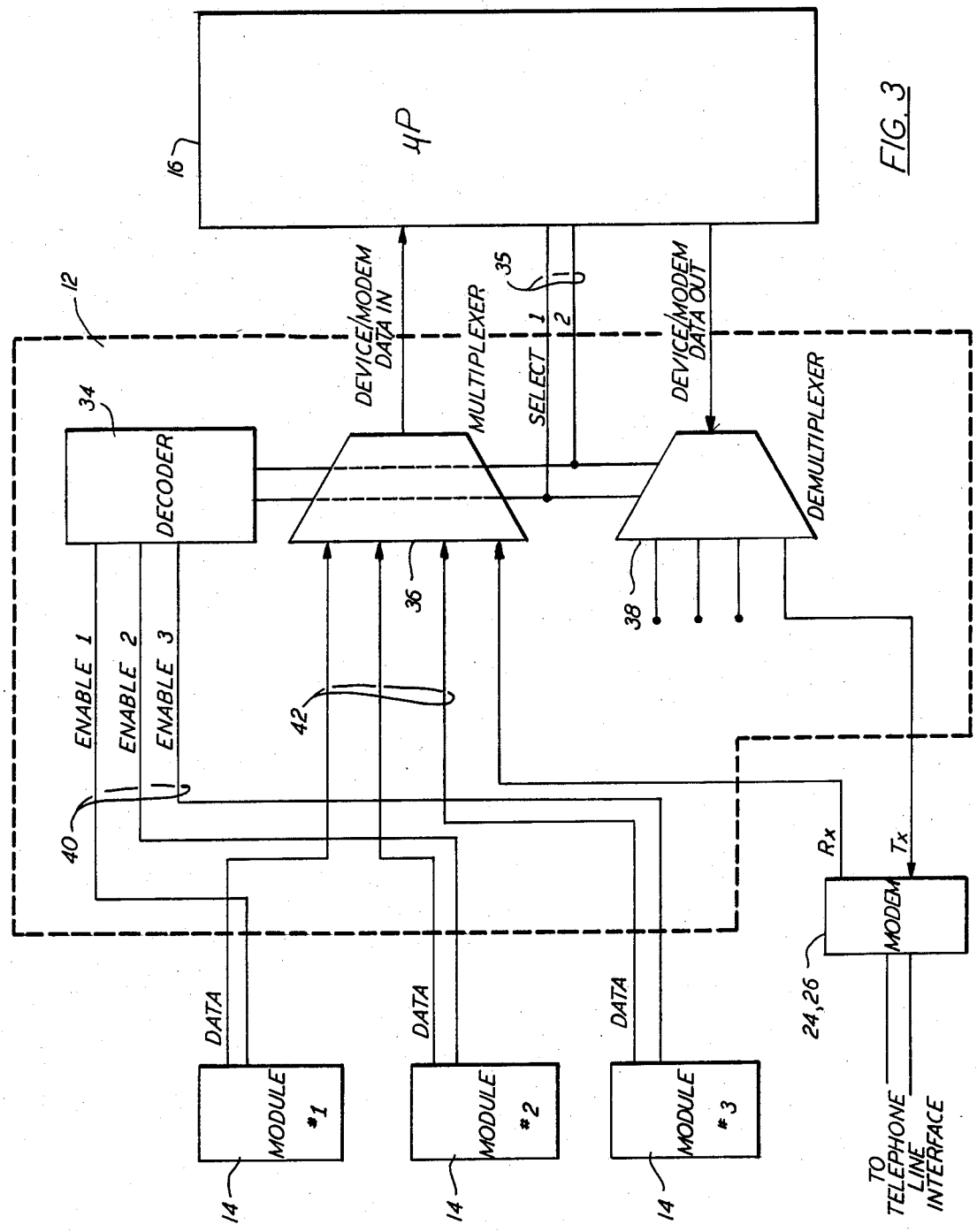
FIG. 3 is a block diagram of the encoder interface shown in FIG. 1.

With particular reference to the block diagram of FIG. 3, the encoder interface means 12 is shown to include a decoder 34, a multiplexer 36 and a demultiplexer 38.

The decoder 34 includes, in this embodiment, three enable lines 40 each interconnecting to one of the modular adapting means 14, more fully discussed below. When properly activated, the decoder 34, via the enabling lines, enables the reading of the information source 11 attached to the selected modular adapting means 14. The decoder 34 is connected directly to the microprocessor 16, via the two device select lines 35, whereon selection of the particular information source 11 to be interrogated is indicated. The two binary bits available on the select lines 35 allows up to four different device indentifications to be outputted from the microprocessor.

The multiplexer 36 receives data from any one or more of the information sources 11 via the modular adapting means 14 via data lines 42 that provide data inputs to the microprocessor 16. The demodulator 26, via the receive line, Rx, thereof provides an additional input, from the remote command and control center 19, to the microprocessor 16.

In a similar fashion the demultiplexer 38 receives the data output from the microprocessor 16 and provides it to the hybrid 22 interfacing with the subscriber telephone line 13 at the subscriber premise. The communication path between the microprocessor and the modem 24, 26 via the demultiplexer 38 is determined by the microprocessor via the state, i.e., HIGH or LOW, of the two binary bits at the two encoder indentification lines 35. As more fully discussed hereinafter with respect to FIG. 4, each modular adapting means 14 is configurable to allow the encoder interface means 12 to interconnect to most, if not all, available, and anticipated, types of meter encoders.

Figure 4:
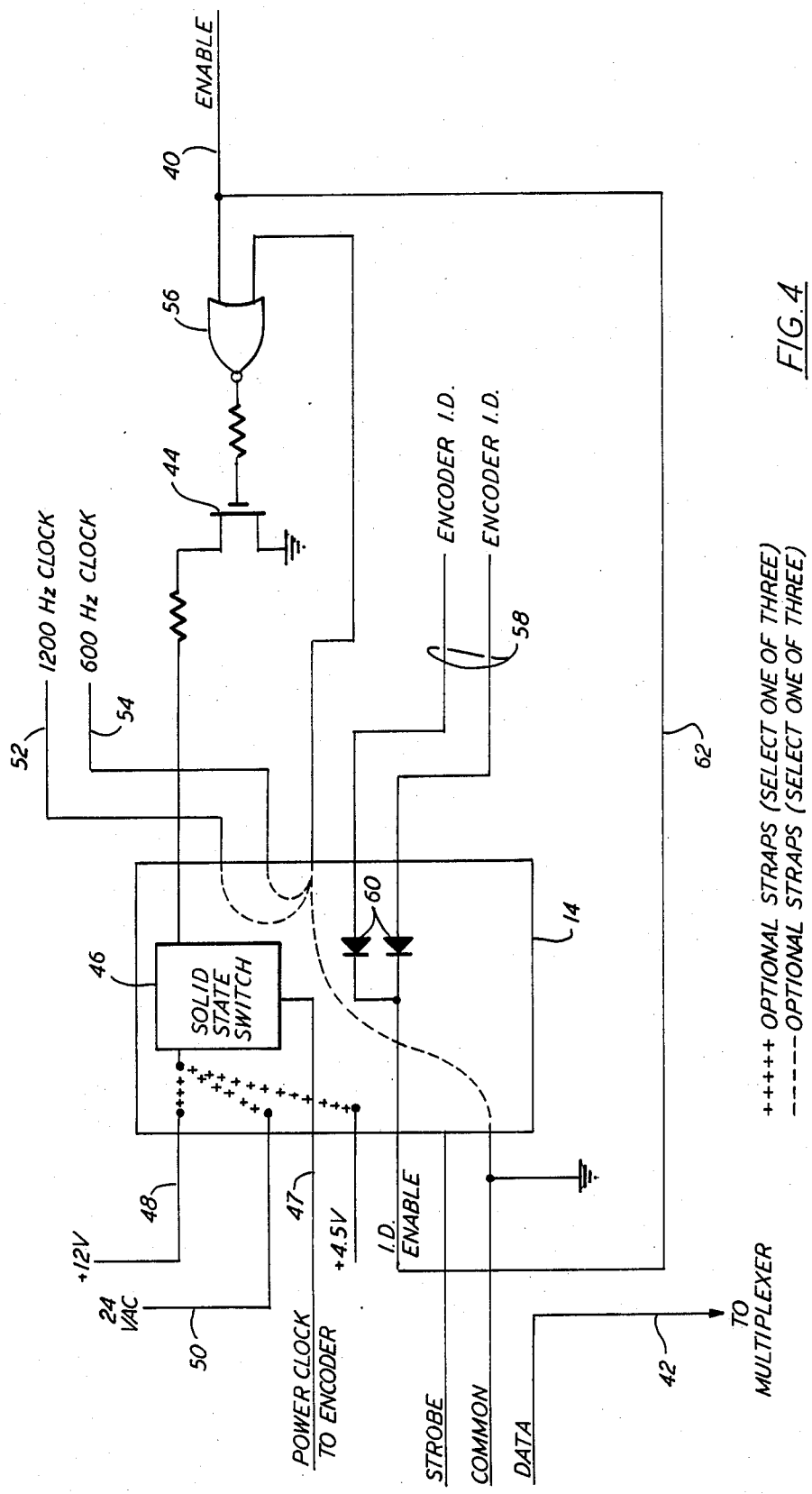
FIG. 4 is a schematic of a typical module adapting means shown in FIGS. 1 and 3.

The modular adapting means 14 and associated circuitry is shown in the schematic diagram of FIG. 4. As shown therein one of the enable lines 40 from the decoder 34, by means of a transistor 44, for example a field effect transistor (FET), controls a solid state switch 46, such as, for example, a transistor circuit. In addition, each modular adapting means 14 has 4.5, 12 and 24 volt inputs 47, 48 and 50, respectively, and 1200 Hertz and 600 Hertz clock lines, 52 and 54, respectively, that provide an input to a NOR gate 56 that sets the position of the solid state switch 46. The modular adapting means 14 also includes a pair of encoder identification lines 58 that are adapted to select any one of four modular adapting means 14. The encoder identifcation lines 58 are connected via a pair of diodes 60 to an identification enable line 62 of the modular adapting means 14 and back to the enable line 40. Hence, when the identification enable line 62 and the pre-wired clock line, 52 or 54, are at the proper binary values the FET 44 can activate the solid state switch 46 to provide power and clock signals to the meter encoder 11.

Within the modular adapting means 14 a plurality of optional straps are provided that are preconnected to adapt the basic modular adapting means 14, and hence the apparatus 10, to the particular type of meter encoder 11. Preferably, in a commercial environment each of the modular adapting means 14 are prewired and assembled for specific types of meter encoders 11 such that they can be inserted into a receptacle within the enclosure of the apparatus 10.

Figure 5:
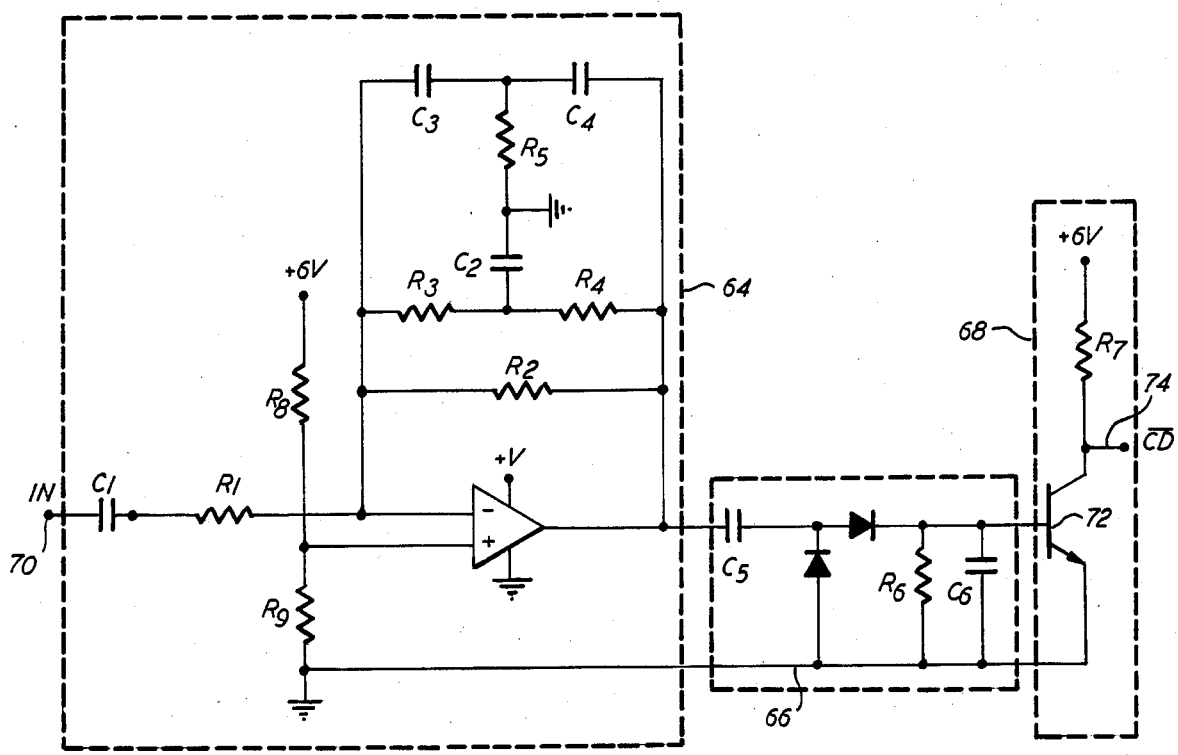
FIG. 5 is a schematic of a typical carrier detection circuit useful with the apparatus shown in FIG. 1.

The carrier detector 30, shown in the schematic of FIG. 5, includes a bandpass filter 64, means 66 for detecting and smoothing the carrier waveform and switch 68. In one embodiment, the input port 70 of the carrier detector 30 is connected to the subscribed network interface 18 via the hybrid 22. The bandpass filter 64 is adapted for a center frequency of about 2200 Hz with a bandwidth of about 100 Hz. A signal about this center frequency as generated by the command and control center 19 when the apparatus 10 is to be activated for making a meter reading. The means 66 operates both as a detector for the 2200 Hz signal passed through the filter 64 and as a low pass filter to prevent spikes and other high frequency transients from reaching the clock synchronization device 32 and, subsequently, the control means 16. The output of the means 66, via, in this embodiment, the base of a transistor 72, regulates the binary state at the output 74. Preferably, in this embodiment, the binary output of the carrier detector 30 is a binary HIGH when the carrier signal is not present and changes to a binary LOW when a carrier signal is detected.

Figure 6:
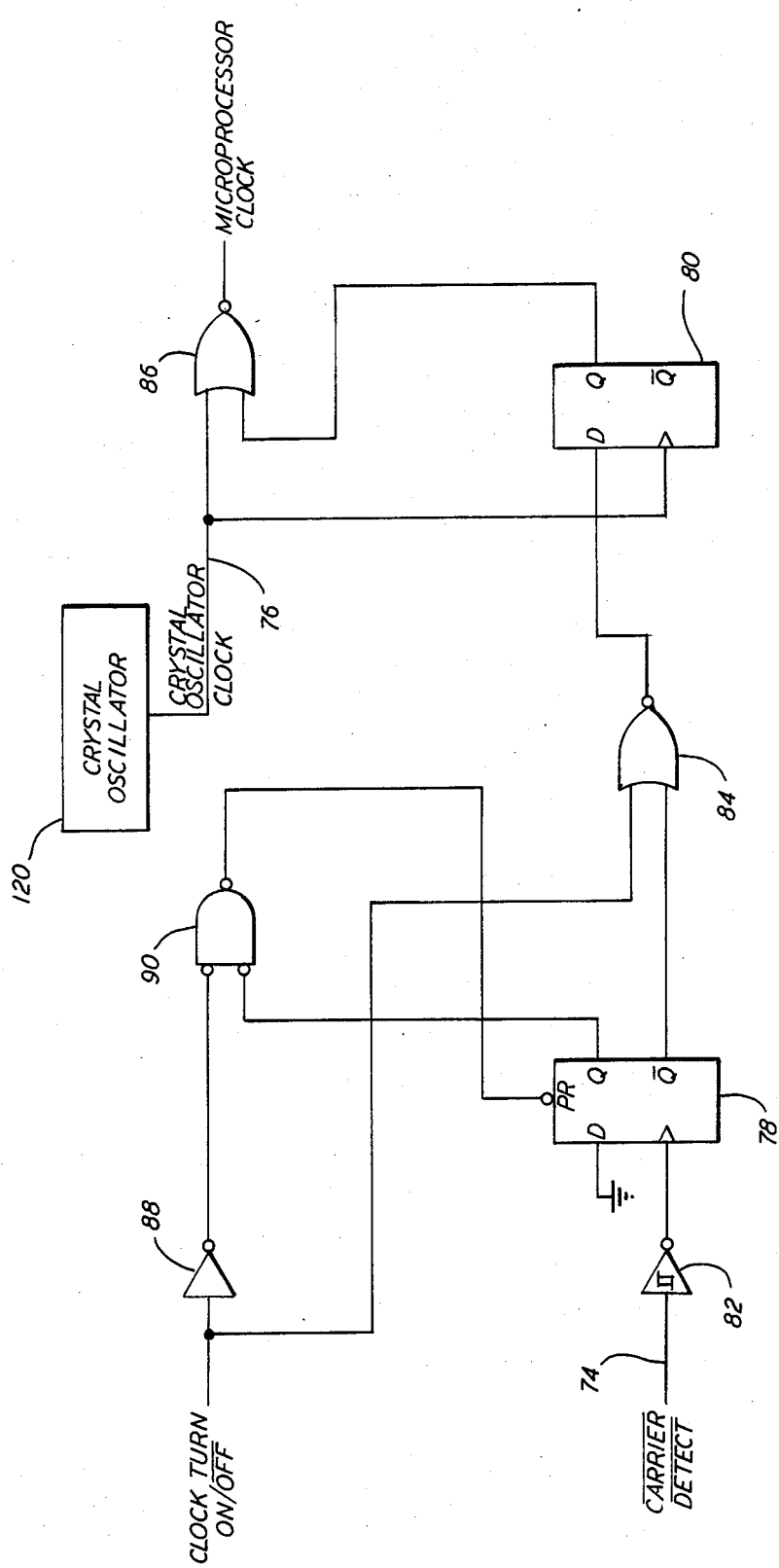
FIG. 6 is a schematic of a clock synchronization circuit useful with the apparatus shown in FIG. 1.

The clock sychronization device 32, shown in FIG. 6, positioned between the carrier detector 30 and the control means 16 of the apparatus 10, includes a crystal oscillator clock input 76, a carrier detect latch 78 for registering the presence of a carrier signal directed to that particular apparatus 10 and clock mode latch 80. In one particular embodiment, the carrier detect latch is a first D flip-flop and the clock mode latch 80 is a second D flip-flop.

In operation, the output port 74 of the carrier detector 30 is, in one embodiment, connected to a Schmitt trigger 82 that, upon the carrier detector 30 output port 74 going from a binary HIGH to a binary LOW provides a rising edge to trigger the latch 78.

This causes the normally LOW of the "D" port to be transferred to the "Q" port with the "Q" port of the latch 78 becoming a HIGH. The binary HIGH from the "Q" of latch 78 causes the output of a first NOR gate 84 to become a binary LOW. This causes the "Q" port of the second latch 80 to become a binary LOW allowing the clock signal from the crystal oscillator clock input 76 to be fed to the clock of the microprocessor via a second NOR gate 86. In order to maintain a rapid start-up upon receipt of a carrier signal the crystal oscillator 120 is continuously operated.

When the microprocessor clock is, thusly, turned on, the input to an inverter 88 is changed from a binary LOW to a binary HIGH. The binary HIGH thus locks the first NOR gate 84 such that the output thereof remains a binary LOW and, simultaneously, causes the output of an OR gate 90 to become a binary LOW. The binary LOW of the OR gate 90 presets the first latch 78. In this state, the microprocessor, by changing the binary value at the clock turn on/off line, can cause the output of the second latch 80 to shut-off the microprocessor clock via the second NOR gate 86. Further, at this state the first latch 78 is ready for the next input from the carrier detector 30. Hence, this clock synchronizing device 32 allows the apparatus 10 to be externally activated and, upon completion of a meter reading, to turn itself off.

Figure 7:
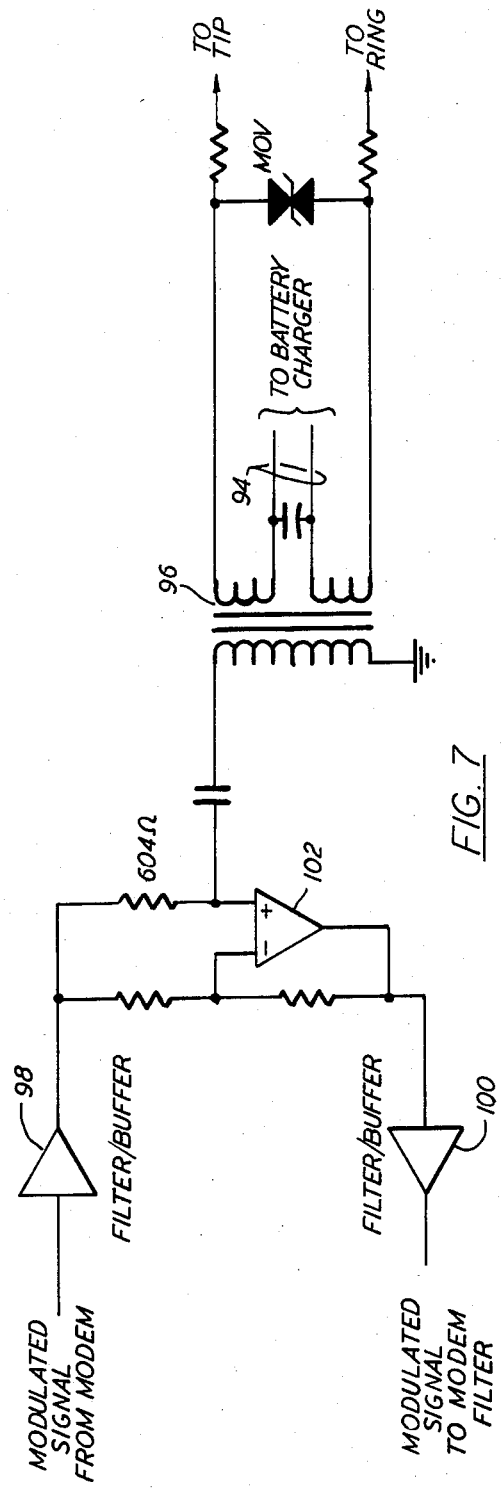
FIG. 7 is a schematic diagram of a line interface hybrid useful with the apparatus shown in FIG. 1.

The microprocessor 16 via the modulator 24 and demodulator 26 interconnects to the tip and ring lines of a telephone line via a hybrid interface 22, shown in the schematic diagram in FIG. 7. As shown therein the tip and ring are connected across a full wave bridge 92 that, in one embodiment, is a transformer including a pair of taps 94 on the primary side 96 thereof for charging the battery 21 of the apparatus 10 during that period of time when it is inactive. In addition, the hybrid 22 includes a first filter/buffer 98 between the modulator 24 and a second filter/buffer 100 between the modem filter and demodulator 26 to ensure the passing thereacross of a frequency band of interest. The signal path is controlled via an op amp 102 operating as a 2 to 4 wire hybrid.

Figure 8:
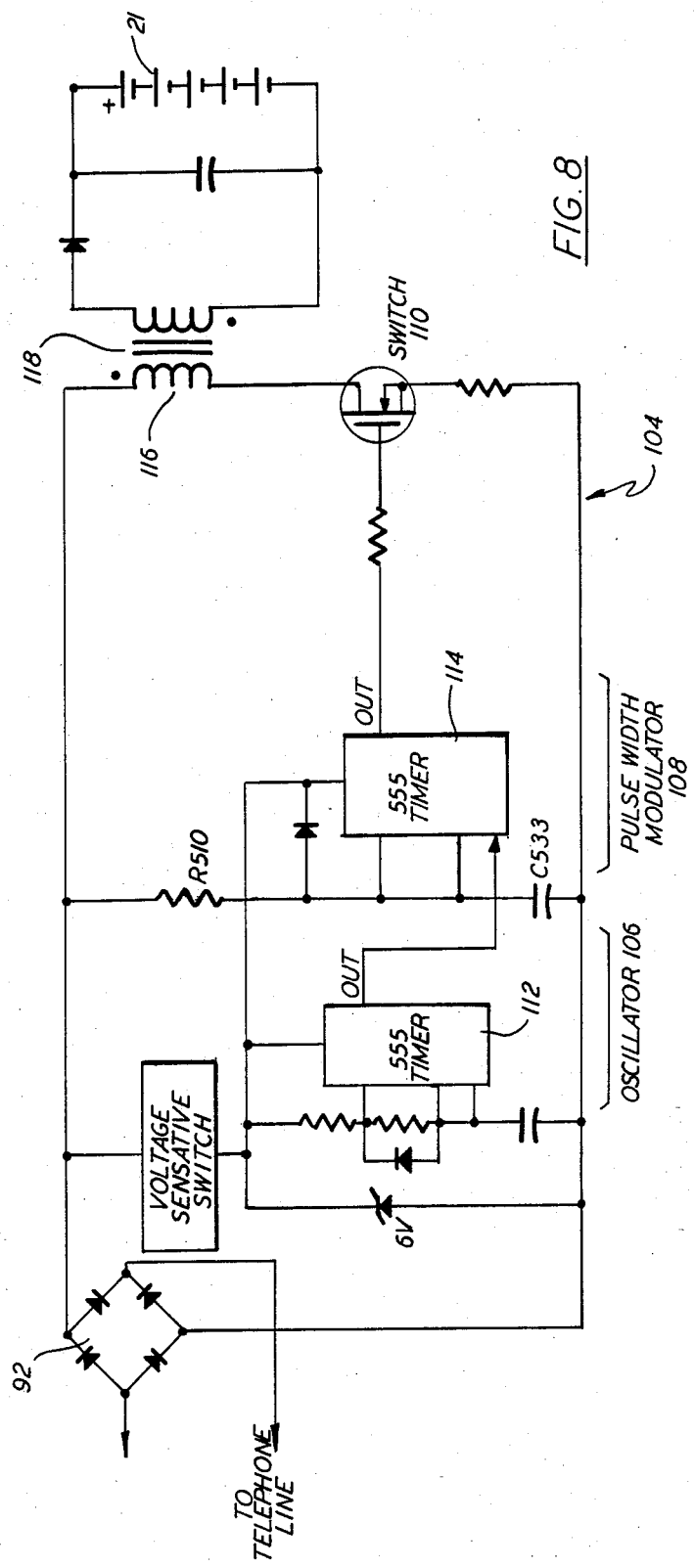
FIG. 8 is a schematic diagram of a battery charger useful with the apparatus shown in FIG. 1.

A battery charger 104, is particularly adapted for use with the apparatus 10, in FIG. 8 and includes an oscillator 106, a pulse width modulator 108 and a switch 110. The battery charger 104 uses the central office battery to provide a trickle charge current to the battery 21 in the apparatus 10. In one particular embodiment, a constant current of about 2.5 milliamps is drawn from the central office battery. The oscillator 106 is, in one specific embodiment, a 555 timer 112 running in an astable mode. The output is thus a series of pulses with a period of about 10 to 12 microseconds. This output triggers the pulse width modulator 108 that, in this particular implementation, is a second 555 timer 114. The pulse width modulator 108 turns on the FET switch 110 each time it is triggered by the oscillator 106. The FET 110 drives a current pulse through an inductor 116. The average current drawn from the telephone subscriber line 18 is determined by the pulse width of the pulse width modulator 108. This pulse width is regulated by the resister and the capacitor as well as the line voltage. Thus, the pulse width varies as the line voltage varies. The inductor 116, driven by the FET switch 110, is preferably the primary side of a transformer 118 that couples the current to the battery 21 of the apparatus 10 and provides isolation between the battery 21 and the subscriber line 18. Consequently, the battery charger 104 appears as a constant current sink to the subscriber line 13, i.e., it draws a filed current, i.e., about 2.5 milliamps, regardless of the live voltage. On the battery side, however, the battery charger 104 provides a fixed voltage output, i.e. about 6 volts, and a variable current. Thus, with the constant current drawn from the subscriber line 13 fixed, the battery charger 104, nevertheless, draws the maximum available energy from the subscriber line 13 and transfers that energy, at a fixed voltage, to the battery 21.

In one particular embodiment, the battery 21 and the battery charger 104 includes a DC to DC converter that converts the battery voltage of approximately 6 volts to 12 volts. This converter can provide about 300 milliamps of current for a minimum of 300 milliseconds without causing the voltage threshold to drop below 10 volts. Such voltage and current conditions are representative of those needed by conventional meter encoders.

In general, the operation of the information collecting and forwarding apparatus 10 is usually initiated by the sending of an address and command information signal from the remote command and control center 19 thereto via the subscriber lines 13. This signal is received by all apparatus 10 attached to that line and, based on the address and command, a particular meter, i.e., information source 11, is selected by the local microprocessor 16 and encoding interface 12. Power is then provided to the meter encoder 11 and information is read by the apparatus 10 upon transmission thereof from the meter encoders attached thereto. This information is retransmitted on the telephone lines back to the remote command and control center 19. Upon transmitting the information the apparatus 10 becomes inactive and the battery charger 104 is switched on to charge the local battery 21 within the apparatus 10.

Figure 9:
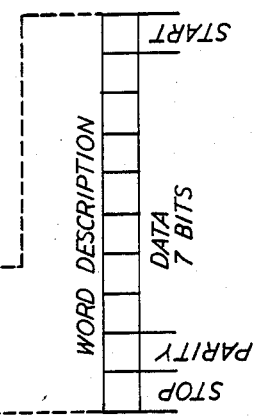
Figure 12:
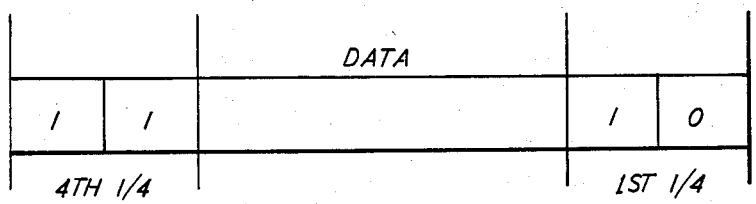
Figure 13:
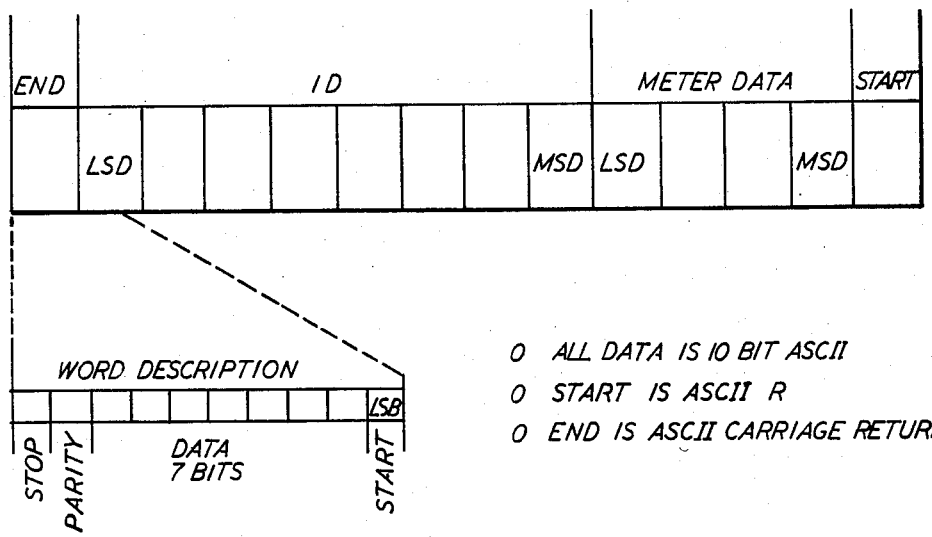
FIG. 13 is a diagram of a typical data format of yet another type of meter encoder.

In general, each meter encoder 11 available transmits serial data at a differnt baud rate and the timer/counter of the microprocessor 16 of the apparatus 10 is used to determine the timing of sampling the bits therefrom. The external clock input 76 to the microprocessor 16 in one particular embodiment, is about 3.68 megaHertz. The microprocessor 16 divides this signal by 5 to ensure that the microprocessor cycle period is about 1.356 microseconds. The same external clock input 76, divided by 3, is the input to the programmable timer on the microprocessor 16 giving a 1.23 megahertz input to the timer. This results in about a 0.81 microsecond period for this timer. Using such a timer prescaler the frequency of the time period can be divided and used to time the reading and transmission of data at any one of the baud rates selected, such as 300, 1200, 2400 and 4800 baud. In addition, each modular adapting means 14 and the encoder interface 12 in conjunction with the controller 16 are adapted to function with any preselected message format. For example, the message format of one conventional encoder consists of nine words. A representative message of this format in shown in FIGS. 9 and 10. Similarly, as shown in FIGS. 11 and 12, a 16 character 4 bit BCD per character message representative of another typical encoder is shown. Further, the data format of yet another encoder is shown in FIG. 13 and is a fourteen word message. The exact programming of the controller 16 can be accomplished using known programming techniques and is dependent upon, inter alia, the type of meter encoders 11 interfaced thereto and the format of signals desired for the command and control center 19.

Figure 14:
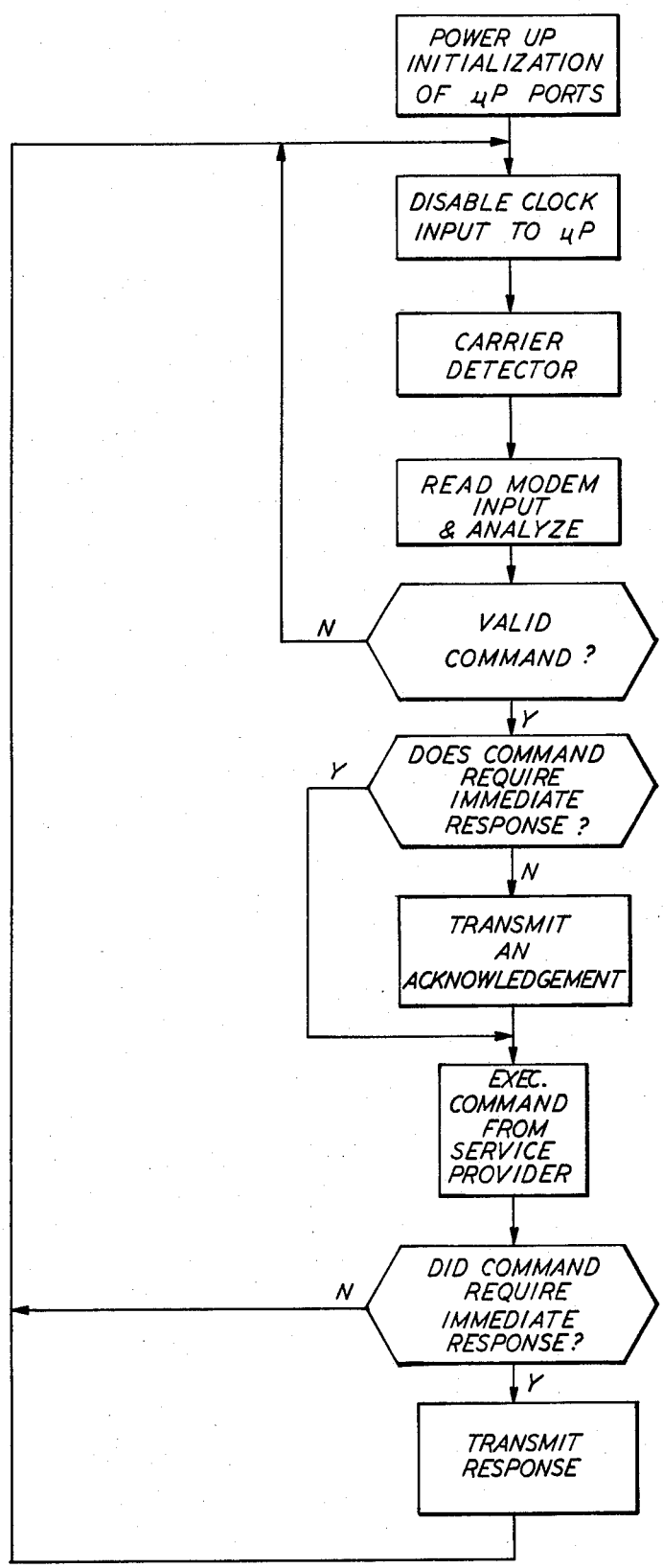
FIG. 14 is a flow diagram of the operation of the controller means shown in FIG. 1.

In one particular implementation, the controller means 16 operates in accordance with the flow diagram shown in FIG. 14.

At power up and initialization, as mentioned above, the direction of the ports and the initial output thereof are set and any alarm flags are cleared. Thereafter, the clock input to the microprocessor is disabled, consequently preventing the microprocessor from executing any further instructions. When a carrier signal is detected, the clock input to the microprocessor is enabled by the circuitry described above for a time sufficient to allow the execution of instructions which lock the clock input to the microprocessor.

When the clock input is enabled the controller means 16 reads the commands received from the remote command and control center 19 via the demodulation 26. Preferably, the data is read at the rate of 1200 bits per second using a programmable timer on the microprocessor to time the synchronization and reading of the bits. The microprocessor, upon reading the input data from the modem, 24 and 26, provides for such events as the bit rate, storing the data bit, detecting stop and start bits, synchronizing on the beginning of each data word. The reception of data from the remote command and control center 19 is terminated when data is no longer forthcoming or a specified number of data words has been received.

The data received is analyzed to verify the integrity of the data. The analysis is performed to, inter alia, avoid the apparatus 10 responding to line noise and includes, but need not be limited to, the following requirements:

1. That a sufficient number of data words have been collected to provide a valid command. This particular requirement additionally allows the apparatus 10 to be used in conjunction with various lengths of line to receive valid data. This is accomplished by including, in a valid command in one embodiment, 9 bytes of null data preceeding the formal content of the message. Thus, a valid message can be found if a minimum of 9 words are received or if a maximum of 18 words are received. Consequently, the means 16 accepts, as valid, message having anywhere from 3 to 12 words of carrier.
2. A check sum is included in the received message to check the integrity thereof.
3. In addition an indentification number contained within the message is mateched to an ID contained in the individual apparatus 10. This condition prevents false activity by an apparatus 10 when a message was not intended therefor and permits the use of multiple apparatus 10 on the same line.
4. The actual command sent in the message is checked to determine if it is executable by the data collection and forwarding apparatus 10. If the command is invalid the command is not executed.

If any one of the listed requirements is not met the microprocessor disables the clock input and does not respond to the received command. In general, these requirements provide security to the system and ensure the integrity of the messages sent.

After a command is validated it is determined if an immediate response is required. If an immediate response is not required, an acknowledgement is transmitted to the remote command and control center 19 and the received command is executed and clock input is again disabled. If an immediate response is required the received command is executed, a response formulated and transmitted prior to the disabling of the clock input. Typically, commands are provided to execute the following functions:

1. Read a specified meter encoder and store the data.
2. Read a specified meter encoder ID and store the data.
3. Read a specified meter encoder and transmit the data.
4. Read a specified meter encoder ID and transmit the data.
5. Transmit the data that has been stored after reading a meter encoder.
6. Transmit the data stored after reading a meter encoder ID.
7. Transmit the status of the information collection and forwarding device.
8. Send the version number of the ROM.

Preferably, all commands to read a meter encoder or read a meter encoder ID begin with the selection of the meter encoder at the port of the microprocessor and reading of the two encoder ID bits to determine the meter encoder type. The meter encoder type is determined based on the position of the meter encoder and the two ID bits. Therefore, there are 16 possible combinations in this particular embodiment. Four of the combinations are used by the modem, 24 and 26, and the other twelve are used by the meter encoders 11. In addition, the controller means 16 includes a table lookup to determine if the meter type is a valid type and, if so, what type. This information is used to indicate, in the response message to the remote command and control center 19, the meter encoder type that was read.

The controller means 16, to read a meter encoder, typically includes means to time and synchronize the data input as well as means for reading and storing that data. A meter encoder reading routine can also include a means for terminating the meter encoder reading routine under conditions when there is a lack of data present or when data collection is completed or when data collection error occur. The timing means typically is executed using a programmable timer on the microprocessor that is programmed to permit data transmission and reception at standard rate of 300, 1200, 4800, etc. baud. Each meter reading, in addition, incorporates the specific data format of the encoder being read to validate data received and the completion of the data reading.

Once the encoder reading is complete the data is preferably, again validated based on the data format specifications of the specific meter encoder 11 and can be decoded and stored for future transmission to the remote command and control center 19.

The apparatus 10 described herein can be used for providing an interface between a remote command and control unit 19 and a subscriber premise for passive and active services. Such passive services include water meter readings, gas meter readings, electric meter readings, vending machine counters, arcade machine counters, office machine counters, oil consumption, cable TV and the like. Active services can include such functions as fire alarm reporting, peak load management, downloading of a decoding algorithm for cable television, electronic mail via home computers, or the like.

The apparatus 10 as described herein provides numerous advantages, for example, the power for the subscriber located meter encoder 11 is derived from the telephone company central office battery and need not be subscriber's A.C. mains; the apparatus 10 can communicate with the central command and control center 19 at, typically, about 1200 bits per second; the apparatus 10 can communicate with multiple meter encoder types 11 at different data rates. Further, the apparatus 10 as described herein is advantageous in that it can verify an incoming address from the remote command and control center 19 thereby providing data security and the ability to put multiple numbers of apparatus 10 on a single telephone line each having a different identification; it allows the remote identification of the meter encoder 11 to be read and conforms to the data format expected thereat; the apparatus 10 is also advantageous since it is provided with the ability to shut itself off when in a standby status thereby reducing standby power consumption and all owing its own battery 21 to be recharged from the central office battery.

Although the present invention has been described with respect to a particular embodiment, it will be understood that other arrangements and configurations may also be developed by those skilled in the art that nevertheless, do not depart from the spirit and scope of the present invention. Hence, the present invention is deemed limited only by the appended claims and the reasonable interpretation thereof.

What is claimed is:

1. An information collecting and forwarding apparatus; said apparatus comprises:
   means for interfacing with a subscriber line, said subscriber line interacing means including a modem and means for activating said control means in response to a signal from a remote signal source, said remote signal source interfacing with said subscriber line via a network interface, said activating means including means for detecting said signal and means, responsive to said detected signal, for providing a clock signal to said control means, said clock signal providing means including means, responsive to a detected signal, for changing the binary input to a first logic gate, said first logic gate having, as a second input thereto, a clock signal, said first logic gate, in response to said changed input, passing said clock signal to the output thereof, said output being connected to said control means said clock signal providing means further including a Schmitt trigger between said first logic gate and said signal detecting means, a first latch between said Schmitt trigger and said first logic gate, a second logic gate, said second logic gate being between said first latch and said first logic gate, a second latch, said second latch being between said second logic gate and said first logic gate;

means for interfacing with one, or more, different information sources;

means for controlling the flow of information between said subscriber interface means and said information interfacing means;

means for providing power to said information sources; and means for recharging said power providing means from said subscriber line.

2. Apparatus as claimed in claim 1 wherein said signal detecting means comprises:

a bandpass filter, said bandpass filter being interfaced to said subscriber line whereby all signals conveyed thereon are inputted to said bandpass filter; and means, responsive to a signal passed by said bandpass filter, for changing the binary state of an output port thereof.

3. Apparatus as claimed in claim 2 further comprising:

a means, between said bandpass filter and said binary state changing means, for reducing transients passed through said bandpass filter.

4. Apparatus as claimed in claim 3 wherein said transient reducing means is a low pass filter.

5. Apparatus as claimed in claim 1 wherein said first and second logic gates are first and second NOR gates and said first and second latches are D flip-flops, said Q output of said first latch being are input to said second NOR gate, said output of said second NOR gate being connected to the D input of said second flip-flop, said Q output of said second flip-flop being one input to said first NOR gate, said first NOR gate having said clock signal as a second input thereto, said first NOR gate having the output thereof connected to said control means.

6. Apparatus as claimed in claim 5 further comprising:

means, responsive to a signal from said control means, for removing said clock signal from said control means.

7. Apparatus as claimed in claim 6 wherein said clock signal removing means includes:

means, responsive to said signal from said control means, for changing said binary input to said first logic gate whereby said clock signal is removed from said control means.

8. Apparatus as claimed in claim 6 further comprising:

means for resetting said first latch, said first latch resetting means including a logical OR gate.

9. Apparatus as claimed in claim 1 further comprising:

means, responsive to a signal from said control means for removing said clock signal therefrom.

10. Apparatus as claimed in claim 1 wherein said means for providing power to said information sources is a battery, said battery further providing power to said apparatus and being located therein.

11. Apparatus as claimed in claim 1 wherein said recharging means includes:

means for transferring, at a relatively constant current, the maximum energy available from said subscriber line and transferring, at a relatively constant voltage, said maximum energy to said battery.

12. Apparatus as claimed in claim 11 wherein said recharging means is a trickle charger having an input thereto connected to said subscriber line.

13. Apparatus as claimed in claim 12 wherein said trickle charger comprises:

an oscillator, said oscillator being connected to said subscriber line;

a pulse width modulator, said pulse width modulator being connected to the output of said oscillator; and a switch, said switch being connected to the output of said pulse width modulator, said switch having one output thereof connected to an inductor, said inductor being in parallel with said power providing means.

14. A method of operating an information collecting and forwarding apparatus; said method comprising the steps of:

enabling, in response to a detected signal, a clock signal to a controller, verifying the validity of said detected signal said verifying step includes the step of counting the number of data words contained within said detected signal; and selecting, based on the results of said verifying step, a first state or a second state for said controller, said first state including disabling said clock signal, in response to an invalid signal, to said controller said second state including responding to a valid signal from said controller.

15. Method as claimed in claim 14 wherein said verifying step includes the steps of:

verifying a check sum;

matching an identification number contained in said detected signal with at least one such identification number stored within said controller; and comparing a portion of said detected signal with a plurality of valid commands stored in said controller.

16. An information collecting and forwarding apparatus; said apparatus comprises:

means for interfacing with a subscriber line, said subscriber line interfacing means including, a modem, said modem including a transformer, said transformer having the primary thereof being connected to said subscriber line, said primary further including taps thereto, said taps being connected to said recharging means, first and second filter/buffer and means for directing a signal through either said first or said second filter buffer, means for interfacing with one, or more, different information sources;

means for controlling the flow of information between said subscriber interface means and said information interfacing means;

means for activating said control means in response to a signal from a remote signal source, said remote signal source interfacing with said subscriber line via a network interface means for providing power to said information sources; and means for recharging said power providing means from said subscriber line.

17. An information collecting and forwarding apparatus; said apparatus comprises:

means for interfacing with a subscriber line;

means for interfacing with one, or more, different information sources, said information source interfacing means including an encoder interface, and a plurality of adapting means, said encoder interface being located between said control means and said plurality of adapting means, and said adapting means being connected to at least one of said information sources said encoder interface includes means, for repsonsive to a signal from said control means, for enabling one of said plurality of adapting means said signal response means being a decoder having two binary information source select bits provided thereto from said control means, said data receiving means being a multiplexer, and said data providing means being a demultiplexer, means for receiving data from each of said plurality of adapting means, and means for providing data from said control means to said subscriber line interface means;

means for controlling the flow of information between said subscriber interface means and said information interfacing means;

means for providing power to said information sources; and means for recharging said power providing means from said subscriber line.

18. An information collecting and forwarding apparatus; said apparatus comprises:

means for interfacing with a subscriber line;

means for interfacing with one, or more, different information sources, said information source interfacing means includes an encoder interface and a plurality of adapting means, said encoder interface being located between said control means and said plurality of adapting means, and said adapting means being connected to at least one of said information sources, each said adapting means including an on-off switch, said switch being activated in response to an enable signal from said encoder interface via a logic gate, said logic gate having a clock signal as an input thereto, and means, adapted for one of said information sources, for receiving information therefrom, said means including a clock strap and a voltage strap whereby said one of said information sources is provided with the correct voltage and clock signals to allow information to be transferred therefrom to said encoder interface.

means for controlling the flow of information between said subscriber interface means and said information interfacing means;

means for providing power to said information sources; and means for recharging said power providing means from said subscriber line.

19. A method of operating an information collecting and forwarding apparatus; said method comprising the steps of:

enabling, in response to a detected signal, a clock signal to a controller, verifying the validity of said undetected signal;

selecting, based on the results of said verifying step, a first state or a second state for said controller, said first state including disabling said clock signal, in response to an invalid signal, to said controller said second state including responding to a valid signal from said controller;

executing, when said second state is selected, a command contained in said detected signal; and disabling, subsequent to said command executing step, said clock signal to said controller.

* * * * *